Dec. 1, 1959     A. B. BROERMAN     2,915,701
ELECTRICAL MEASURING APPARATUS

Filed Feb. 14, 1957     4 Sheets-Sheet 1

INVENTOR.
A. B. BROERMAN
BY Hudson & Young
ATTORNEYS

Dec. 1, 1959    A. B. BROERMAN    2,915,701
ELECTRICAL MEASURING APPARATUS
Filed Feb. 14, 1957    4 Sheets-Sheet 3

INVENTOR.
A. B. BROERMAN
BY Hudson & Young
ATTORNEYS

Dec. 1, 1959     A. B. BROERMAN     2,915,701
ELECTRICAL MEASURING APPARATUS
Filed Feb. 14, 1957     4 Sheets-Sheet 4
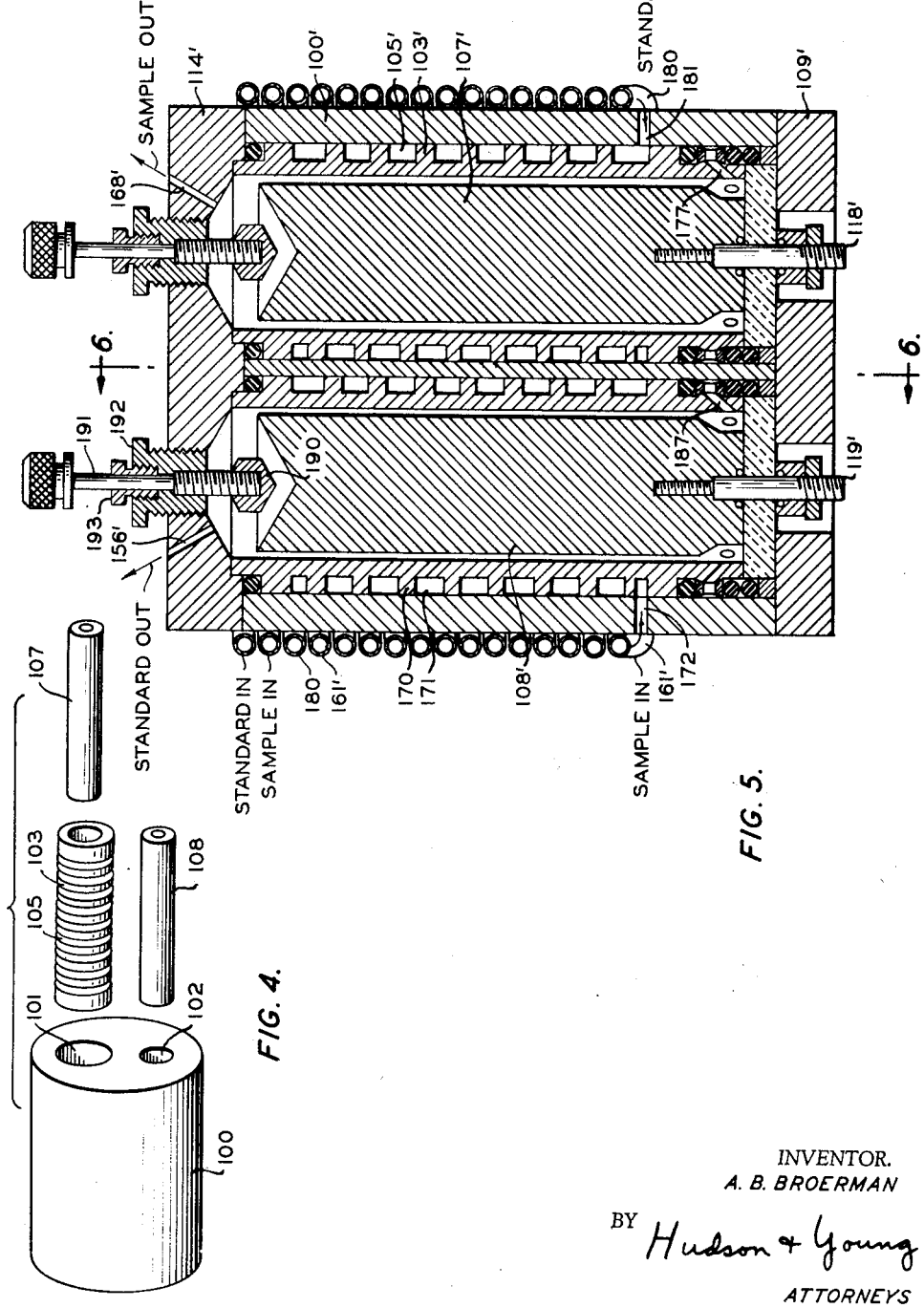
INVENTOR.
A. B. BROERMAN
BY *Hudson & Young*
ATTORNEYS United States Patent Office 2,915,701
Patented Dec. 1, 1959

2,915,701

ELECTRICAL MEASURING APPARATUS

Arthur B. Broerman, Bartlesville, Okla., assignor to Phillips Petroleum Company, a corporation of Delaware Application February 14, 1957, Serial No. 640,144

2 Claims. (Cl. 324—61)

This invention relates to the detection and analysis of fluids in terms of the dielectric properties thereof. In another aspect it relates to a differential cell for comparing the dielectric properties of a sample fluid with those of a reference fluid.

The measurement of the dielectric properties of materials has become a valuable industrial and laboratory procedure for determining compositions. This procedure is particularly useful in analyzing fluid streams. In accordance with the present invention, an improved cell assembly is provided for use in comparing the dielectric properties of a sample fluid with those of a reference fluid. The apparatus comprises two electrical condensers which are mounted in symmetrical relationship with one another. Two condensers are formed by a block of conductive material which has two cylindrical openings therein. Cylindrical electrodes are positioned within these openings to form condensers with the walls of the openings. The two fluids to be compared are disposed in respective passages between the electrodes and the walls of the openings. In one embodiment of the cell assembly of this invention, a sleeve having a helical recess in the periphery thereof is disposed in one of the openings so that the condenser is formed between the cylindrical electrode and the inner wall of the sleeve. The fluid disposed in the opposite condenser is circulated through the helical recess to provide heat exchange between the two fluids. In a second embodiment of the cell assembly of this invention, a corresponding sleeve is disposed in the other opening. This permits even more efficient heat exchange between the two fluids. A pressure equalizer is provided to maintain the two fluids being compared at the same pressure.

Accordingly, it is an object of this invention to provide improved apparatus for detecting and analyzing fluids in terms of the dielectric properties thereof.

Another object is to provide a differential cell assembly for use in comparing the dielectric properties of a sample fluid with those of a reference fluid.

A further object is to provide a dielectric measuring cell assembly wherein provision is made for temperature and pressure equalization between fluids being compared.

Other objects, advantages and features of the invention should become apparent from the following detailed description which is taken in conjunction with the accompanying drawing in which:

Figure 4 is an exploded view of a portion of the cell assembly of Figure 2.

Figure 5 is a sectional view of a second embodiment of the differential cell assembly.

Figure 1:
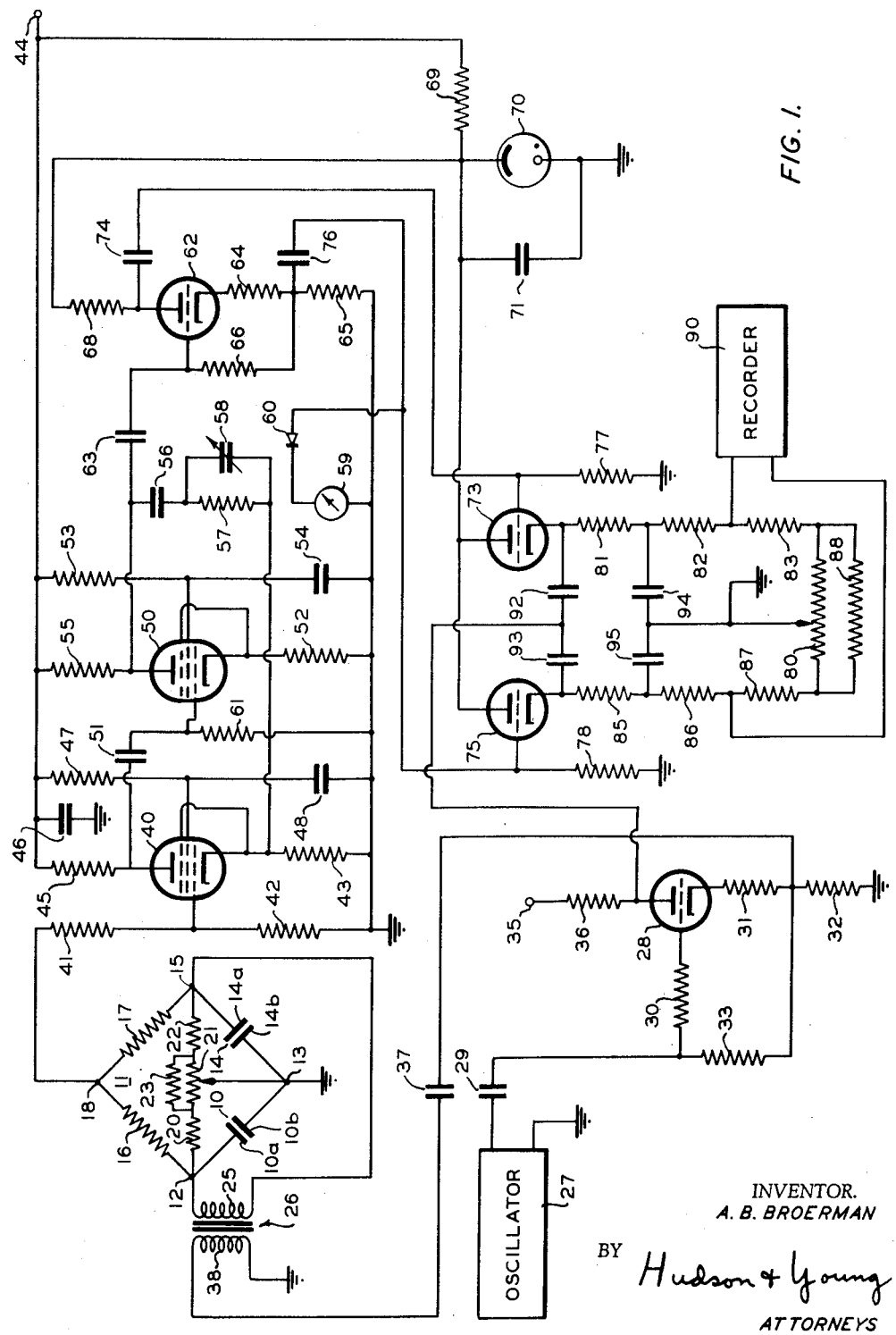
Figure 1 is a schematic circuit diagram of measuring apparatus which can be employed in conjunction with the cell assembly of this invention.

Referring now to the drawing in detail and to Figure 1 in particular, there are shown a pair of capacitors 10 and 14 which form the two elements of the differential cell of this invention. Capacitor 10 is adapted to have a sample fluid to be tested positioned between the spaced plates 10a and 10b. Capacitor 14 is adapted to have a reference fluid positioned between the spaced plates 14a and 14b. These two capacitors are connected in a bridge network 11. Capacitor plates 10b and 14b are connected to one another and to ground. Capacitor plates 10a and 14a are connected to respective bridge terminals 12 and 15. Resistors 16 and 17 are connected in series relationship between terminals 12 and 15. The junction between these resistors is designated as terminal 18. A resistor 20, a potentiometer 21 and a resistor 22 are connected in series relationship between terminals 12 and 15. A resistor 23 is connected in parallel with potentiometer 21. The contactor of potentiometer 21 is connected to grounded bridge terminal 13. Bridge terminals 12 and 15 are connected to the respective end terminals of the secondary winding 25 of a transformer 26.

Transformer 26 is energized from the output of an oscillator 27. The first output terminal of oscillator 27 is connected to the control grid of a triode 28 through a capacitor 29 and a resistor 30 which are connected in series relationship. The cathode of triode 28 is connected to ground through series connected resistors 31 and 32. The junction between resistor 30 and capacitor 29 is connected to the junction between resistors 31 and 32 by a resistor 33. The anode of triode 28 is connected to a positive potential terminal 35 through a resistor 36. The junction between resistors 31 and 32 is connected through a capacitor 37 to one terminal of the primary winding 38 of transformer 26. The second terminal of transformer winding 38 is connected to ground.

Output terminal 18 of bridge network 11 is connected to the control grid of a pentode 40 through a resistor 41. The control grid of pentode 40 is connected to ground through a resistor 42. The cathode and suppressor grid of pentode 40 are connected to ground through a resistor 43. The anode of pentode 40 is connected to a positive potential terminal 44 through a resistor 45. A capacitor 46 is connected between terminal 44 and ground. The screen grid of pentode 40 is connected to terminal 44 through a resistor 47 and to ground through a capacitor 48. The anode of pentode 40 is also connected to the control grid of a pentode 50 through a capacitor 51. A resistor 61 is connected between the control grid of pentode 50 and ground. The cathode and suppressor grid of pentode 50 are connected to ground through a resistor 52. The screen grid of pentode 50 is connected to terminal 44 through a resistor 53 and to ground through a capacitor 54. The anode of pentode 50 is connected to terminal 44 through a resistor 55.

The anode of pentode 50 is also connected to the cathode of pentode 40 through a feedback network which comprises a capacitor 56 and a resistor 57 which are connected in series relationship. A variable capacitor 58 is connected in parallel with resistor 57 to change the phase of the feedback signal.

The anode of pentode 50 is connected to the control grid of a triode 62 through a capacitor 63. The cathode of triode 62 is connected to ground through series connected resistors 64 and 65. The control grid of triode 62 is connected to ground through series connected resistors 66 and 65. The anode of triode 62 is connected to terminal 44 through series connected resistors 68 and 69. A voltage regulating tube 70 is connected between ground and the junction between resistors 68 and 69, and a capacitor 71 is connected in parallel with this tube.

The anode of triode 62 is also connected to the control grid of a triode 73 through a capacitor 74. The junction between resistors 64 and 65 is connected to the control grid of a triode 75 through a capacitor 76. The control grids of triodes 73 and 75 are connected to ground through respective resistors 77 and 78. A null detecting meter 59 is connected between ground and the grid of triode 75 through rectifier 60. The anodes of triodes 73 and 75 are connected to one another and to terminal 44 through resistor 69. The cathode of triode 73 is connected to the first end terminal of a potentiometer 80 through series connected resistors 81, 82 and 83. The cathode of triode 75 is connected to the second end terminal of potentiometer 80 through series connected resistors 85, 86 and 87. The contactor of potentiometer 80 is connected to ground. A resistor 88 is connected in parallel with potentiometer 80. The junction between resistors 82 and 83 is connected to the first input terminal of a recorder 90, and the junction between resistors 86 and 87 is connected to the second input terminal of recorder 90. The anode of triode 28 is connected to the cathodes of triodes 73 and 75 through respective capacitors 92 and 93. A capacitor 94 is connected between ground and the junction between resistors 81 and 82, and a capacitor 95 is connected between ground and the junction between resistors 85 and 86.

The operation of the apparatus of Figure 1 will now be described. The output of oscillator 27 is applied through cathode follower 28 and transformer 26 across terminals 12 and 15 of bridge network 11. It should be evident that this network forms a capacity bridge. If the bridge is balanced there is a zero potential difference between terminals 13 and 18. However, any unbalance of the bridge due to a change in capacitance of element 10 results in the potential at terminal 18 changing from ground potential. Also, any unbalance in the resistance arm including resistors 20, 21, 22 and 23 or any change in the loss factor of the material in condenser 10 results in the potential at terminal 18 changing from ground potential. This latter potential is 90° out of phase with the potential due to a change in capacity of condenser 10. This potential is applied to the grid of pentode 40. Any unbalance signal is amplified by pentodes 40 and 50 and applied to the control grid of triode 62. Triode 62 provides two output signals which are 180° out of phase with one another. These two signals are applied to the control grids of triodes 73 and 75, respectively. Triodes 73 and 75 and the associated circuit form a phase sensitive detector. A reference signal is applied to the cathodes of these tubes from the output of triode 28. The two signals applied to the phase detector network are thus of the same frequency because they are both obtained from oscillator 27. The currents through the two triodes are functions of the amplitudes of the signals applied to the control grids and the phases of these signals with respect to the reference signal applied to the cathodes. The resistors and capacitors in the cathode circuits of the two triodes filter the currents through the triodes. If the capacitance of capacitor 10 should become greater than that of capacitor 14, bridge network 11 is unbalanced in a first direction. If the capacitance of capacitor 10 becomes less than that of capacitor 14 the bridge is unbalanced in the opposite direction. The phase of the output signal from the bridge thus changes by 180° when the direction of the unbalance changes.

Bridge network 11 is balanced initially by varying capacitor 14 and potentiometer 21 until the recorder reads zero, or a predetermined value as determined by the setting of the contactor of potentiometer 80, when a reference material is disposed between the plates of capacitor 10. The contactor of potentiometer 21 alone is then moved to determine if the signal applied to recorder 90 changes. If a change is observed, capacitor 58 is varied to change the phase of the signal applied to the control grid of triode 62. Adjustment of capacitor 58 is continued to restore the recorder to the initial value. The contactor of potentiometer 21 is then adjusted until the reading of meter 59 is zero, which indicates that there is a zero potential difference between bridge terminals 13 and 18. At this final point, any further change of the position of the contactor of potentiometer 21 does not change the recorder reading. The bridge circuit is then balanced and the apparatus is ready to be operated. Any change in capacitance of capacitor 10 results in a change in the signal applied to recorder 90. If desired, this signal can be employed to operate suitable control equipment to adjust a process variable so that the material being tested retains a desired dielectric constant.

Figure 2:
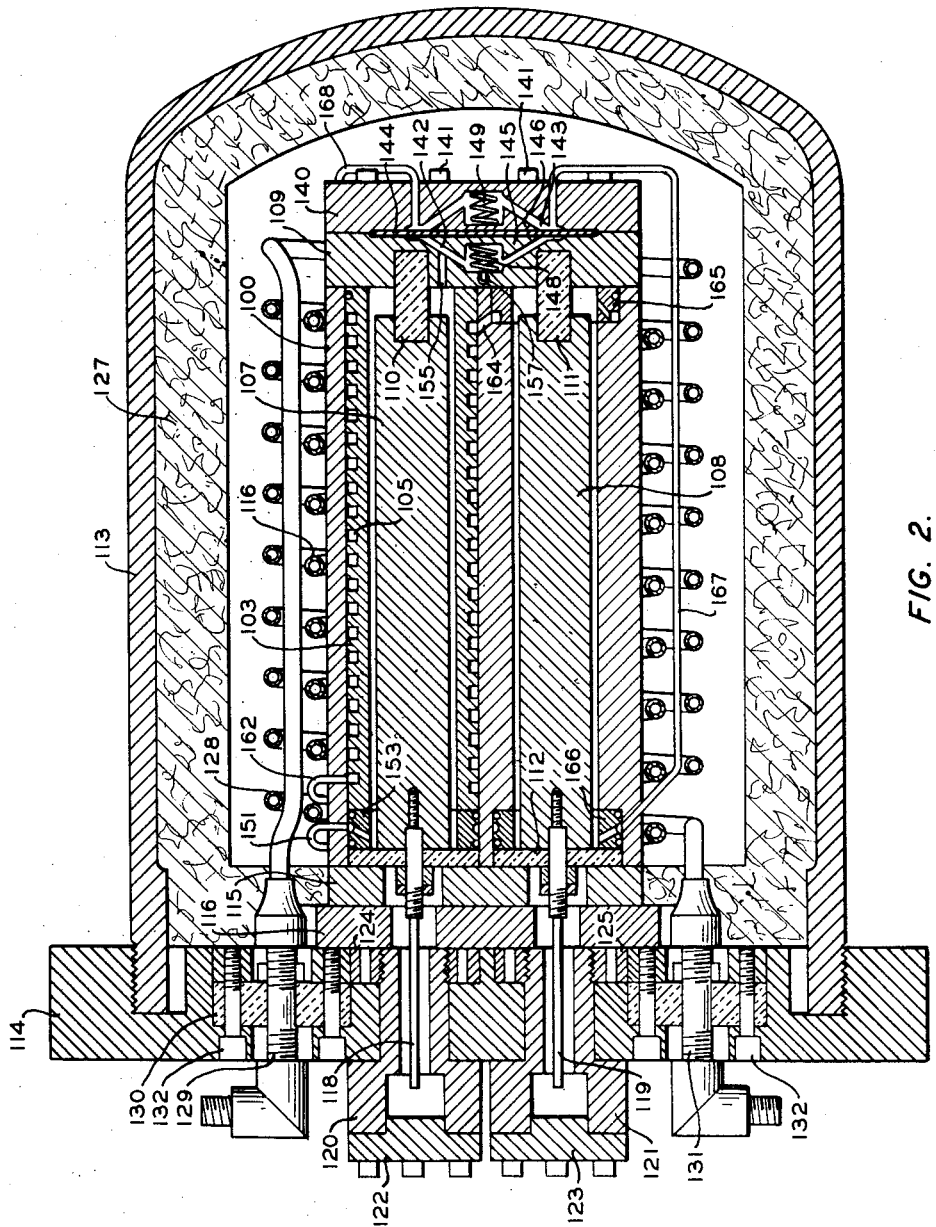
Figure 2 is a sectional view of a first embodiment of the differential cell assembly.
Figure 3:
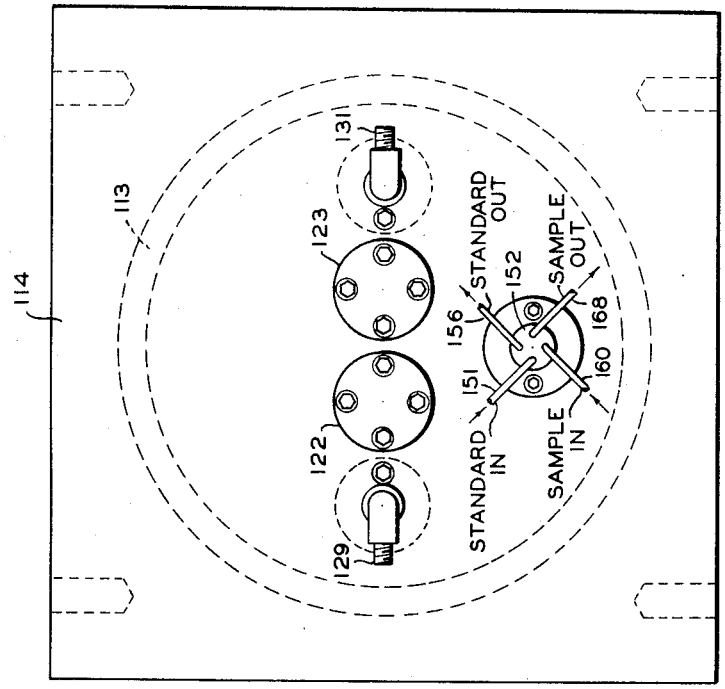
Figure 3 is an end view of the cell assembly of Figure 2.

A first embodiment of the differential cell assembly of capacitors 10 and 14 is illustrated in Figures 2, 3, and 4. With reference to Figure 4, the principal components of this cell assembly comprise a cylindrical metal block 100 which has two cylindrical longitudinal passages 101 and 102 formed therein. A sleeve 103 is adapted to be fitted into opening 101 so as to make a snug fit therewith. Sleeve 103 is provided with a helical recess 105 about the periphery thereof. A first cylindrical electrode 107 is adapted to be fitted into the opening of sleeve 103 so as to form an electrical condenser therewith. The diameter of electrode 107 is less than the inner diameter of sleeve 103. A second cylindrical electrode 108 is adapted to be fitted into passage 102 to form an electrical condenser therewith. Electrode 108 is of smaller diameter than passage 102.

This cell assembly is illustrated in detail in Figures 2 and 3. The first ends of electrodes 107 and 108 are attached to a first end plate 109 by means of respective insulating pins 110 and 111. These pins can be formed of quartz, for example. An insulating plate 112 is fitted across the second end of block 100 to hold the electrodes and sleeve 103 within the block. The entire assembly is positioned within an explosion proof bell 113 which has a cover plate 114 threaded thereto. Plates 115 and 116 extend between plate 112 and cover plate 114. Electrodes 118 and 119 are attached to respective electrodes 107 and 108 and extend outwardly through openings in cover plate 114. The openings for these electrodes are defined by respective flanged sleeves 120 and 121 which have respective caps 122 and 123 secured thereto. Sleeves 120 and 121 are threaded into respective nipples 124 and 125. A plurality of holes can be formed in these nipples to minimize heat transfer through cover plate 114. Sleeves 120 and 121 have openings, not shown, therein through which electrical leads extend to engage electrodes 118 and 119.

In some applications of this invention, it is desirable to measure the dielectric properties of a sample fluid at a temperature above or below ambient temperature. A mass of heat insulating material 127 is positioned within bell 113 to permit the interior of the bell to be maintained at such a temperature. A coil 128 is also disposed within bell 113 to permit passage of a heating or cooling fluid to provide the desired temperature. This heat exchange fluid is introduced into coil 128 by means of an inlet conduit 129 which extends through a heat insulating plate 130 that is disposed across the end of bell 113. This fluid is removed from coil 128 by an outlet conduit 131 which also extends through plate 130. Plate 130 is attached to cover plate 114 by means of screws 132.

A pressure equalizing assembly is included within bell 113 to maintain the sample and reference fluids at a common pressure. This pressure equalizer is formed by plate 109 and a second plate 140 which is attached thereto by screws 141. Plates 109 and 140 are provided with respective cavities 142 and 143 which are separated by a diaphragm 114. Diaphragm backing plates 145 and 146 are disposed in respective cavities 142 and 143. Springs 148 and 149 normally urge diaphragm 144 to a center position. If the pressure of the fluid in one of the cavities is greater than the pressure in the fluid in the other cavity, the diaphragm is deflected so as to change the relative volumes of the two cavities. This change in volume is sufficient to equalize small pressure differentials.

A reference fluid normally occupies cavity 142 and the region between electrode 107 and sleeve 103. This reference fluid is disposed in these chambers initially by passing such a fluid into bell 113 through a conduit 151 which extends through a plug 152 in plate 114, see Figures 2 and 3. Conduit 151 communicates with a diffuser ring 153 which is mounted in block 100 at the end of sleeve 103. The reference fluid flows from this diffuser ring through the space between electrode 107 and sleeve 103 and into cavity 142 through a passage 155. This reference fluid occupies cavity 142 and is removed from bell 113 through an outlet conduit 156 which communicates with an opening 157 in cavity 142. The reference fluid is allowed to flow through this path until all air bubbles are removed. Suitable valves external of the assembly are then closed to trap the reference fluid in this region. This fluid forms the dielectric between electrode 107 and sleeve 103. Sleeve 103 is in electrical contact with the grounded assembly.

The sample fluid to be measured forms the dielectric between the condenser plates formed by electrode 108 and the surrounding wall of block 100. This sample fluid is introduced into bell 113 through an inlet conduit 160 which communicates with coil 161 that encloses block 100 and makes thermal contact therewith. The sample fluid thus circulates about block 100 so as to acquire the temperature of the block. The second end of coil 161 is connected by a conduit 162 to recess 105 in sleeve 103. The sample fluid thus circulates about sleeve 103 to provide additional heat exchange with the reference fluid inside the sleeve. The second end of recess 105 is connected by a passage 164 with a diffuser ring 165 which introduces the sample fluid into the region between electrode 108 and block 100. The purpose of this diffuser ring is to prevent channeling of the fluid in the analyzing region of the annular cell. The ring also serves as a seal to prevent fluid leakage. The fluid flows through the region between electrode 108 and block 100 and is removed through a second diffuser ring 166 which is connected by a conduit 167 to cavity 143 of the pressure equalizer. The sample fluid is removed from chamber 143 through a conduit 168 which passes out of bell 113 through cover plate 114.

Figure 6:
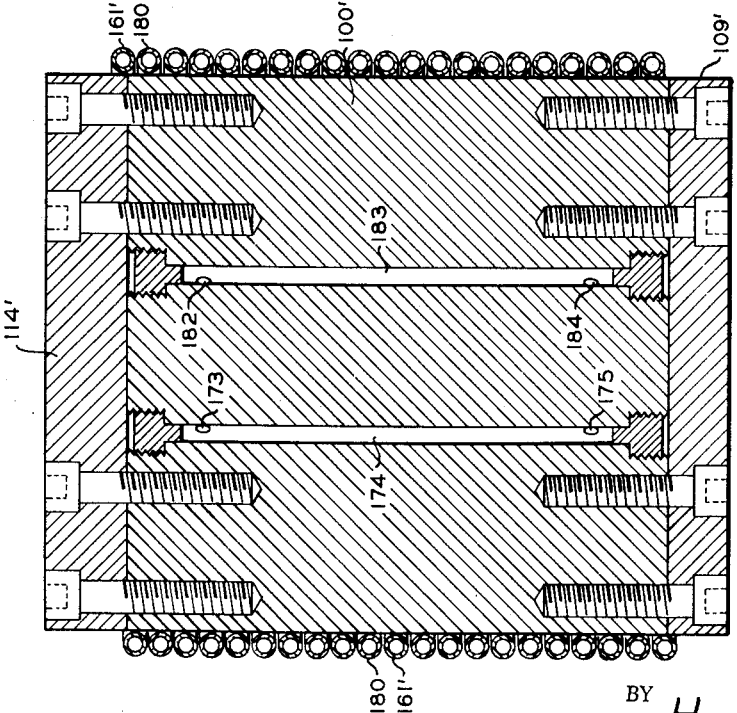
Figure 6 is a sectional view taken along the line 6—6 in Figure 5.

In Figures 5 and 6, there is shown a second embodiment of the differential cell assembly which is generally similar to the assembly of Figure 2 and wherein corresponding elements are designated by like primed reference numerals. The assembly of Figures 5 and 6 provides additional means for circulating the reference fluid in a helical path about the condenser which has the sample fluid forming the dielectric thereof. This arrangement permits even more efficient heat exchange and is particularly valuable when it is desired to compare a first flowing sample with a second flowing sample. Electrode 108' of Figure 5 is enclosed within a sleeve 170 which has a helical recess 171 in the periphery thereof. The first fluid to be measured is passed through a coil 161' which surrounds block 100'. This first fluid then enters recess 171 through a passage 172. After flowing through recess 171, the fluid is transmitted by passages 173, 174, and 175, see Figure 6, into a diffuser ring 177 in sleeve 103'. The first fluid then flows between electrode 107' and sleeve 103' and is removed through an outlet passage 168'. The second fluid flows through a coil 180 which surrounds plug 100' and enters recess 105' through a passage 181. After flowing through recess 105', the second fluid is transmitted through passages 182, 183, and 184, see Figure 6, into a second diffuser ring 187 in sleeve 170. The second fluid then flows between electrode 108' and sleeve 170 and is removed through an outlet passage 156'.

Means are provided in the cell assembly of Figure 5 to adjust the capacitances of both condenser units. A first plug 190 is attached to a rod 191 which is threaded into cover plate 114' through a nipple 192. Plug 190 can thus be moved toward or away from electrode 108' to decrease or increase the capacitance of the assembly. A sealing plug 193 is threaded into nipple 192. A similar assembly is provided in conjunction with electrode 107', and corresponding elements are designated by like primed reference numerals. Obviously, a pressure equalizer can be employed in conjunction with the apparatus of Figures 5 and 6, if desired.

From the foregoing description of present preferred embodiments of this invention, it should be evident that an improved assembly is provided for comparing the dielectric properties of two fluids. This assembly offers several decided advantages over dielectric measuring apparatus known heretofore. The cell assembly is enclosed within a solid block of heat conductive material which provides efficient heat exchange between the two fluids. The fluids flow through elongated paths in thermal contact with one another so as to provide temperature equalization. An insulated housing is provided through which a cooling or heating medium can be circulated to maintain the cell assembly at a desired temperature above or below ambient temperature. The symmetrical construction of the assembly provides equal coefficients of thermal expansion throughout so that both condensers are varied in a like manner by a temperature change. It is important that the assembly be constructed accurately. For example, in one particular application the unit was employed to detect water in hydrocarbons in the range of 0–50 parts per million. It was found that an alignment error of the electrodes as small as 0.001 inch gave an output error of 100 parts per million.

While the invention has been described in conjunction with present preferred embodiments, it should be evident that it is not limited thereto.

What is claimed is:

1. Apparatus for use in comparing the dielectric properties of a first fluid with those of a second fluid comprising a housing having two cylindrical openings therein spaced from one another, a cylindrical sleeve positioned within said first opening so as to be coaxial therewith, the external diameter of said sleeve being substantially the same as the diameter of said first opening, said sleeve having a spiral recess about the periphery thereof so that a fluid can be circulated in a helical path between said sleeve and said housing from one end of said sleeve to the other end thereof, a first electrode positioned within said sleeve in spaced relationship therewith, a second cylindrical electrode positioned within the second of said openings so as to be coaxial therewith and in spaced relationship with said housing, means closing said second opening so that a fluid can be disposed therein between said second electrode and said housing, means closing said first opening so that a fluid can be disposed therein between said first electrode and said sleeve, first conduit means communicating with said recess at one end of said sleeve to introduce a fluid, an annular member in said second opening adjacent one end of said second electrode, said member having a circular opening therein and a plurality of ports communicating between said circular opening and spaced regions between said second electrode and said housing, second conduit means communicating between said recess at the second end of said sleeve and said circular opening, and third conduit means communicating between the opposite end of said region between said second electrode and said housing and a region exterior of said housing.

2. Apparatus for use in comparing the dielectric properties of a first fluid with those of a second fluid comprising a housing having two cylindrical openings therein spaced from one another, a first cylindrical sleeve positioned within said first opening so as to be coaxial therewith, the external diameter of said first sleeve being substantially the same as the diameter of said first opening, said first sleeve having a spiral recess about the periphery thereof so that fluid can be circulated in a helical path between said first sleeve and said housing from one end of said sleeve to the other end thereof, a first electrode positioned within said sleeve in spaced relationship therewith, means closing said first opening so that a fluid can be contained therein between said first electrode and said first sleeve, a second cylindrical sleeve positioned within said second opening so as to be coaxial therewith, the external diameter of said second sleeve being substantially the same as the diameter of said second opening, said second sleeve having a spiral recess about the periphery thereof so that a fluid can be circulated in a helical path between said second sleeve and said housing from one end of said sleeve to the other end thereof, a second electrode positioned within said second sleeve in spaced relationship therewith, means closing said second opening so that a fluid can be contained therein between said second electrode and said second sleeve, first conduit means communicating with the recess at one end of said first sleeve to introduce a fluid, a first annular member in said second sleeve adjacent one end of said second electrode, said first member having a first circular opening therein and a plurality of first ports communicating between said first circular opening and spaced regions between said second electrode and said second sleeve, second conduit means communicating between the recess at the second end of said first sleeve and said first circular opening, third conduit means communicating between the opposite end of the region between said second electrode and said second sleeve and a region exterior of said housing, fourth conduit means communicating with the recess at one end of said second sleeve to introduce a fluid, a second annular member in said first sleeve adjacent one end of said first electrode, said second member having a second circular opening therein and a plurality of second ports communicating between said second circular opening and spaced regions between said first electrode and said first sleeve, fourth conduit means communicating between the recess at the second end of said second sleeve and said second circular opening, and sixth conduit means communicating between the opposite end of the region between said first electrode and said first sleeve and a region exterior of said housing.

References Cited in the file of this patent

UNITED STATES PATENTS

| | | |
|---|---|---|
| 1,925,805 | Holle | Sept. 5, 1933 |
| 2,485,579 | Elliott | Oct. 25, 1949 |
| 2,541,578 | Egalon et al. | Feb. 13, 1951 |
| 2,783,420 | Thompson et al. | Feb. 26, 1957 |
| 2,800,628 | Stinson et al. | July 23, 1957 |
| 2,826,738 | Lupfer et al. | Mar. 11, 1958 |